(No Model.)

S. ATKINSON.
VEHICLE SPRING.

No. 346,016.　　　　　　　　Patented July 20, 1886.

WITNESSES:
Darwin S. Wolcott
C. M. Clarke

INVENTOR,
Samuel Atkinson
George H. Christy, Att'y.

N. PETERS, Photo-Lithographer, Washington, D. C.

UNITED STATES PATENT OFFICE.

SAMUEL ATKINSON, OF CINCINNATI, OHIO.

VEHICLE-SPRING.

SPECIFICATION forming part of Letters Patent No. 346,016, dated July 20, 1886.

Application filed May 20, 1886. Serial No. 202,798. (No model.)

*To all whom it may concern:*

Be it known that I, SAMUEL ATKINSON, a subject of the Queen of Great Britain, residing at Cincinnati, in the county of Hamilton and State of Ohio, have invented or discovered certain new and useful Improvements in Vehicle-Springs, of which improvements the following is a specification.

Figure 1:
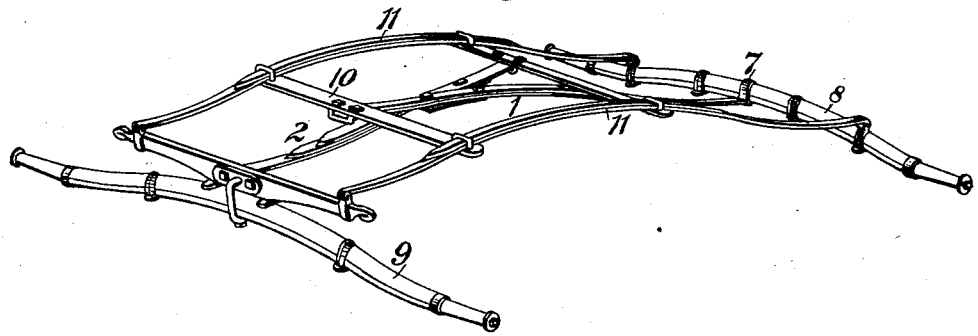
Figure 2:
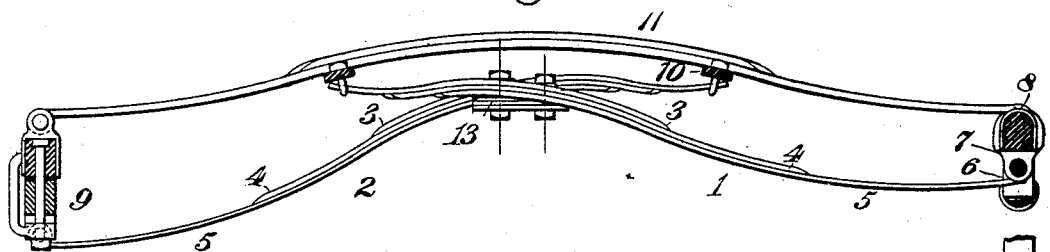
Figure 3:
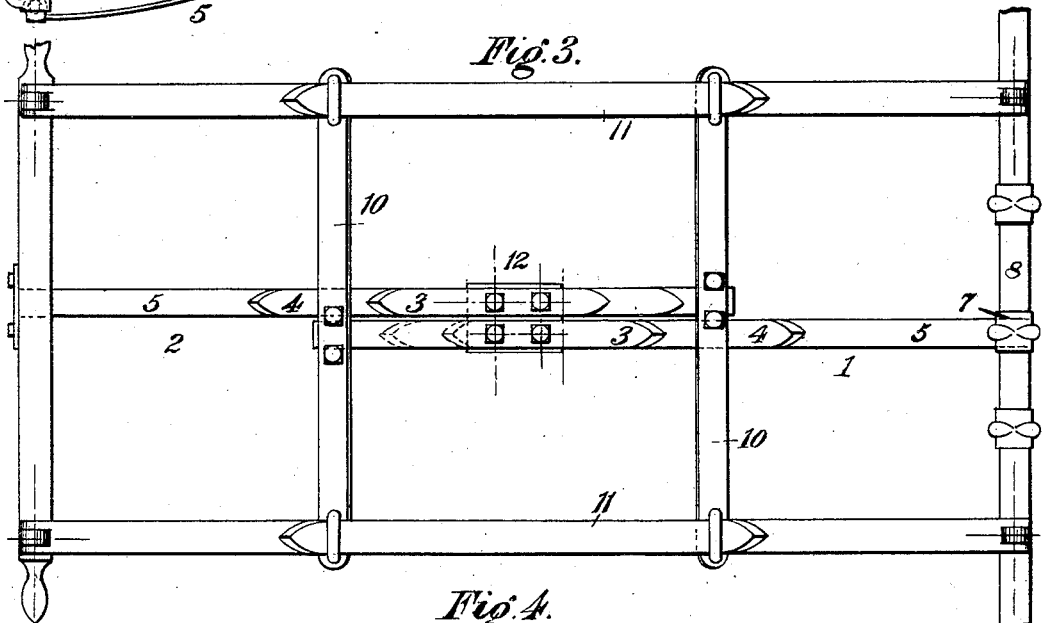
Figure 4:
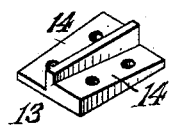

In the accompanying drawings, which make part of this specification, Figure 1 is a perspective view of the running-gear of a buggy embodying my invention. Fig. 2 is a central longitudinal section of the same. Fig. 3 is a top plan view. Fig. 4 is a detail view of the clip.

The invention herein relates to certain improvements in spring-reaches for side-spring buggies or other vehicles, and has for its object such a construction and arrangement of parts as will prevent any forward or backward pitching of the body of the vehicle, and avoiding the use of braces now used for that purpose.

In general terms, the invention consists in the construction and combination of parts, substantially as hereinafter described and claimed.

In carrying out my invention I prefer to use a spring similar to that shown and described in Letters Patent No. 302,618, granted to me July 29, 1884; but I do not wish to limit myself to that form of spring, as other forms or constructions of springs, arranged and connected as hereinafter set forth, will accomplish the desired result.

As set forth in said patent, the spring consists of two parts or halves, 1 and 2, arranged alongside of each other. Each part or half consists of a series of leaves, 3, 4, and 5, arranged one upon the other, as shown. The leaves 5 are provided at their outer ends with eyes 6, whereby said leaves are connected, one by a suitable clip, 7, to the rear axle, 8, (see Fig. 2,) and the other to the head-frame on the front axle, 9. The body portion of these leaves 5 are bent into reverse curves, as clearly shown.

On the leaves 5 are placed the leaves 4, curved to correspond to the curvature of the leaves 5, and having their inner ends projecting beyond the inner ends of the leaves 5. The top leaves, 3, are placed upon the leaves 4, their inner ends projecting beyond the inner ends of the leaves 4, are connected by suitable clips to the cross bars or braces 10, said braces having their ends attached by suitable clips to the side springs, 11. These braces 10 serve not only as means for connecting the side and reach springs together, but also as means for connecting the body of the vehicle and the springs together.

The leaves 3, 4, and 5 are connected together by bolts 12, passing therethrough, said bolts serving to attach the two parts or halves 1 and 2, formed by said leaves, to the plate or block 13, having seats 14, adapted to fit the under side of the parts 1 and 2.

Springs arranged as above described—*i. e.*, extending from the front and rear axles to a point beyond the center of the vehicle-body—can be used as side springs with advantage.

It will be seen from the above that if a load were placed at either end of the body the opposite end thereof would be depressed to the same degree as the end at which the load is placed, as the two parts composing said springs are rigidly secured together by the block 13, and therefore any motion imparted to one part of said spring will be transmitted to the other part, thus insuring an equal movement in the same direction to all parts of the body.

I am aware that springs extending from the front to the rear axle have been used as side and reach springs, and hence do not broadly claim such construction.

The parts or halves 1 and 2 may be formed of any number of leaves desired or found necessary.

I claim herein as my invention—

1. The combination of two springs composed of one or more leaves, said springs extending, respectively, from the front and rear axles to a point beyond the center of the body of the vehicles, and rigidly secured together at their crossing-point, the inner ends of said springs being suitably connected to the body of the vehicle, substantially as set forth.

2. A reach for vehicles having in combination two springs composed of one or more leaves, said springs extending from the headblock and rear axle, respectively, to a point beyond the center of the vehicle-body, and having their inner ends connected to the vehicle-body, said springs being rigidly connected at their crossing-point, substantially as set forth.

In testimony whereof I have hereunto set my hand.

SAMUEL ATKINSON.

Witnesses:
 THOS. A. SNIDER,
 JOHN WINTER.